(12) United States Patent
Shinada

(10) Patent No.: US 6,252,694 B1
(45) Date of Patent: Jun. 26, 2001

(54) INTERNAL-SURFACE-SCANNING IMAGE RECORDING APPARATUS

(75) Inventor: Hidetoshi Shinada, Hertfordshire (GB)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/566,801

(22) Filed: May 8, 2000

(30) Foreign Application Priority Data

May 20, 1999 (JP) .................................................. 11-140845

(51) Int. Cl.$^7$ .................................................... G02B 26/08
(52) U.S. Cl. .......................... 359/201; 359/201; 359/226; 358/493
(58) Field of Search ..................... 359/201, 202, 359/203, 212, 220, 221, 223, 226, 305, 485, 487, 490, 495, 618, 629; 347/256–260; 358/474, 490, 491, 493, 296

(56) References Cited

U.S. PATENT DOCUMENTS

| | | |
|---|---|---|
| 4,060,322 | 11/1977 | Hirayama et al. ...................... 355/60 |
| 4,588,254 | 5/1986 | Menke et al. . |
| 5,583,687 | * 12/1996 | Zelenka ................................. 359/226 |
| 5,892,610 | * 4/1999 | Rolfe et al. ........................... 359/198 |

FOREIGN PATENT DOCUMENTS

| | | | |
|---|---|---|---|
| 2 407 893 | 8/1974 | (DE) | ................................ H04N/1/04 |
| 0 915 613 A1 | 5/1999 | (EP) | ................................ H04N/1/19 |
| 2 601 786 | 1/1988 | (FR) | ................................ G02B/26/10 |
| 2 325 755 | 12/1998 | (GB) | ................................ H04N/1/06 |

* cited by examiner

*Primary Examiner*—James Phan
(74) *Attorney, Agent, or Firm*—Sughrue, Mion, Zinn, Macpeak & Seas, PLLC (57) ABSTRACT

A laser beam emitted from a laser beam generator is modulated by a laser beam modulator depending on an image to be recorded, and then guided by a reflecting area or a transmitting area of a laser beam switcher toward one of reflecting surfaces of respective spinners. The laser beam is then reflected thereby toward a recording medium attached to an inner circumferential surface of a semicylindrical drum. The spinners alternately scan the recording medium with the laser beam while they are being displaced axially in the semicylindrical drum, so that a two-dimensional image can efficiently be recorded on the recording medium.

13 Claims, 11 Drawing Sheets

INTERNAL-SURFACE-SCANNING IMAGE RECORDING APPARATUS

BACKGROUND OF THE INVENTION

1. Field of the Invention

The present invention relates to an internal-surface-scanning image recording apparatus for efficiently recording an image on a recording medium.

2. Description of the Related Art

One type of image recording apparatus for recording an image on a sheet-like recording medium with a laser beam is known as an internal-surface-scanning image recording apparatus. The internal-surface-scanning image recording apparatus has a hollow cylindrical drum with a sheet-like recording medium attached to an inner circumferential surface thereof, and an optical system disposed coaxially in the drum for guiding a laser beam to the recording medium.

Figure 11:
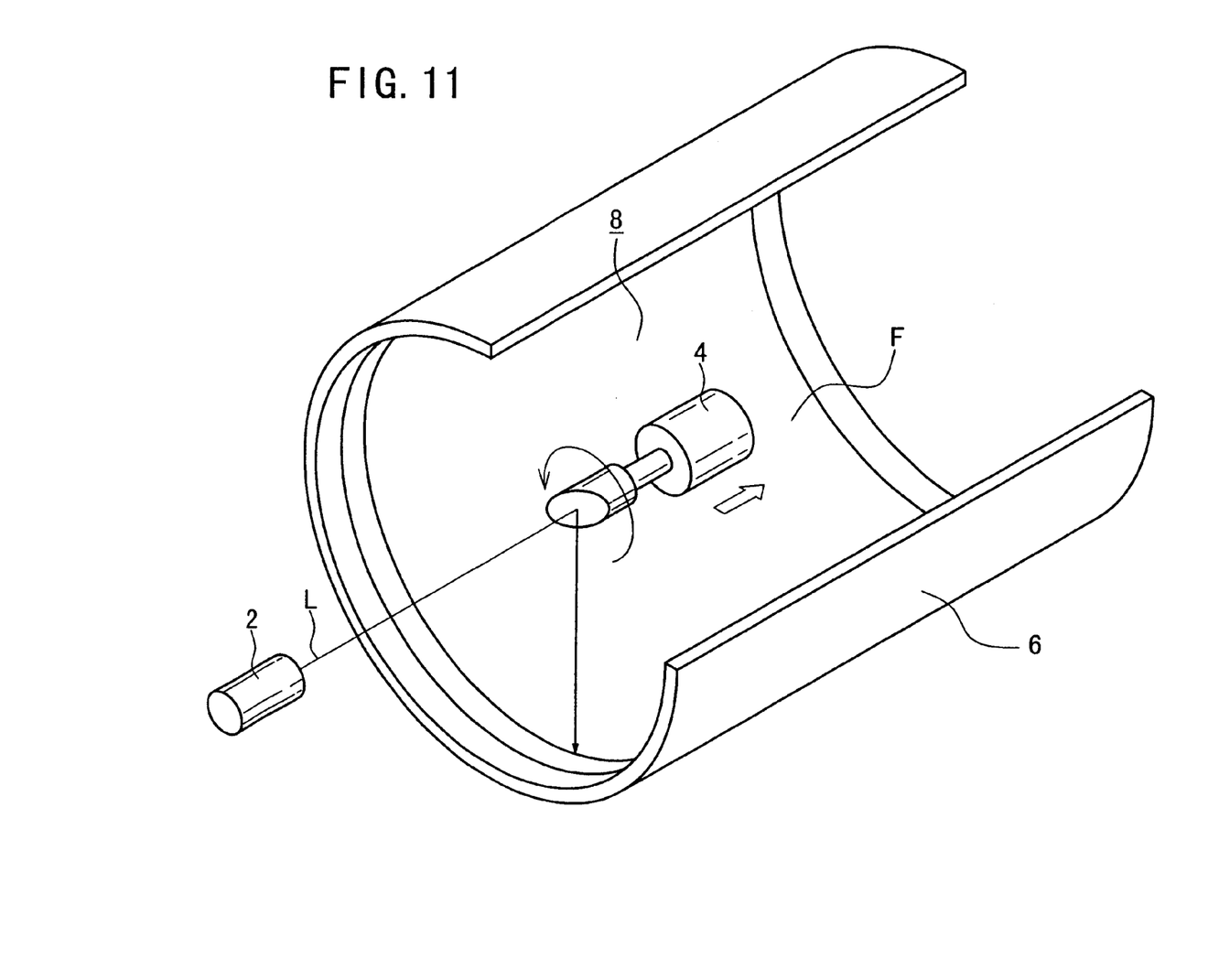
FIG. 11 is a perspective view of a conventional internal-surface-scanning image recording apparatus.

Specifically, as shown in FIG. 11 of the accompanying drawings, a spinner 4 disposed coaxially in a hollow cylindrical drum 6 has a reflecting surface inclined at 45° to the optical axis of a laser beam L which is emitted from a laser beam source 2 positioned outside of the drum 6. When the spinner 4 is rotated about its own axis at a high speed and axially displaced along the central axis of the drum 6, the reflecting surface of the spinner 4 reflects the laser beam L to a recording medium F attached to an inner circumferential surface of the drum 6 to record a two-dimensional image on the recording medium F.

Since the recording medium F is attached to the inner circumferential surface of the drum 6, the recording medium F is prevented from being accidentally peeled off the drum 6 while the image is being recorded on the recording medium F, and the image can be recorded on the recording medium F with high dimensional accuracy.

The drum 6 has a slot 8 defined partly therein for allowing the recording medium F to be attached therethrough to the inner circumferential surface of the drum 6. Since no image is recorded while the laser beam L reflected by the reflecting surface of the spinner 4 traverses the slot 8, the internal-surface-scanning image recording apparatus shown in FIG. 11 suffers a waste of time and laser beam energy while in operation. As a result, the internal-surface-scanning image recording apparatus shown in FIG. 11 records an image on the recording medium F with relatively low efficiency.

SUMMARY OF THE INVENTION

It is a general object of the present invention to provide an internal-surface-scanning image recording apparatus which is capable of recording an image efficiently on a recording medium.

A major object of the present invention is to provide an internal-surface-scanning image recording apparatus which is capable of effectively utilizing a light beam for recording an image on a recording medium.

Another object of the present invention is to provide an internal-surface-scanning image recording apparatus which is capable of shortening a period of time to record an image on a recording medium.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Like or corresponding parts are denoted by like or corresponding reference characters throughout views.

Figure 1:
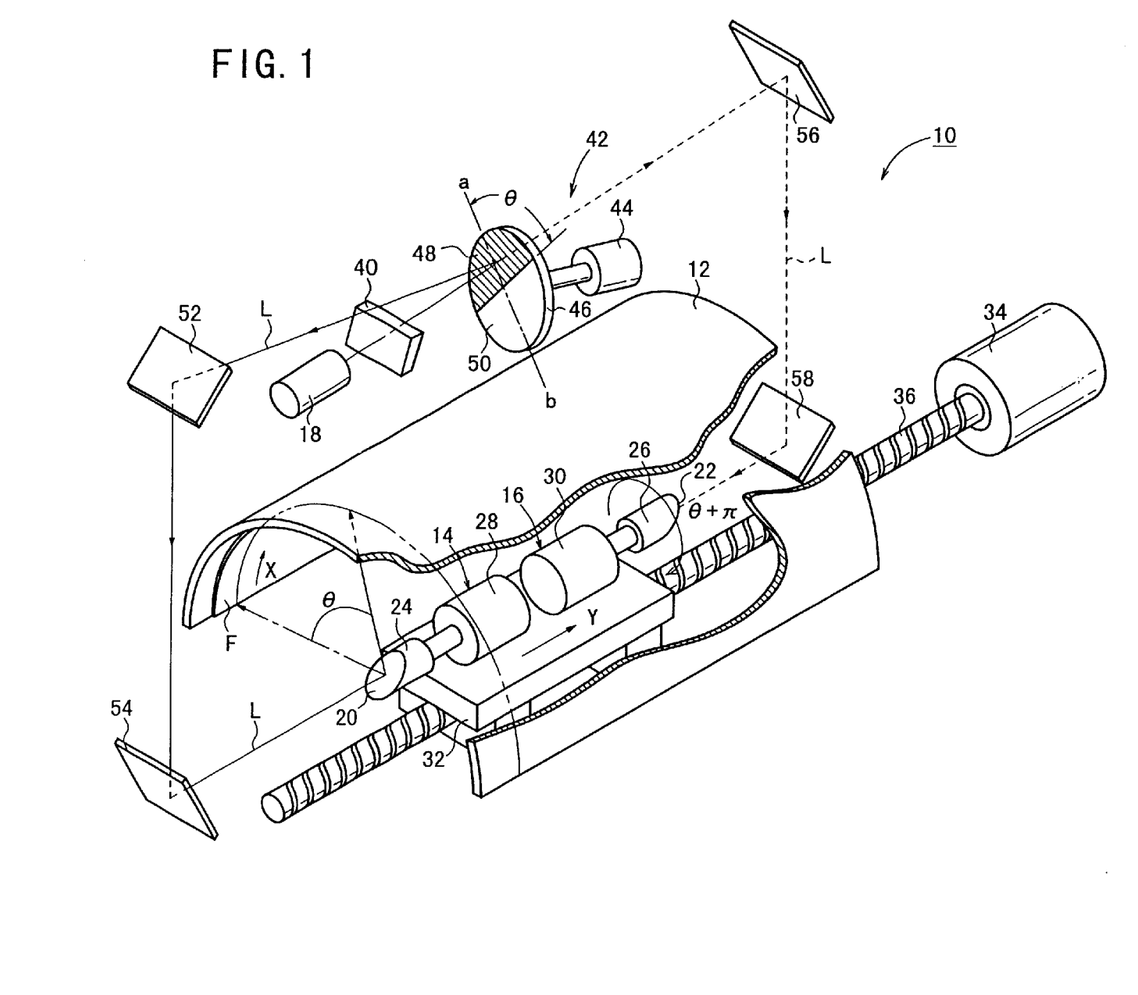
FIG. 1 a fragmentary perspective view of an internal-surface-scanning image recording apparatus according to an embodiment of the present invention.
Figure 2:
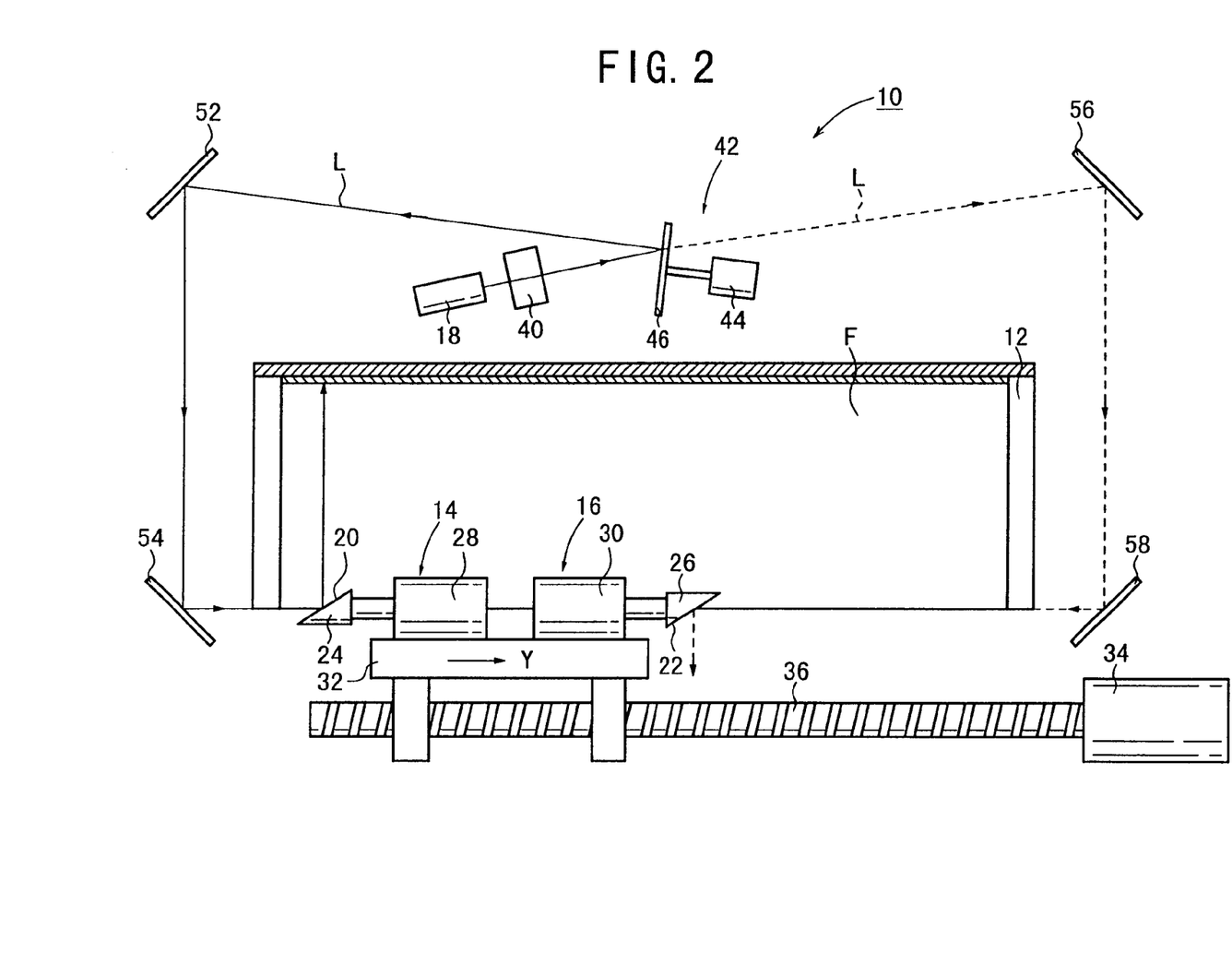
FIG. 2 is a sectional side elevational view of the internal-surface-scanning image recording apparatus shown in FIG. 1.

FIGS. 1 and 2 show an internal-surface-scanning image recording apparatus 10 according to an embodiment of the present invention. As shown in FIGS. 1 and 2, the internal-surface-scanning image recording apparatus 10 has a hollow semicylindrical drum 12, i.e., a cylindrical drum with a slot defined therein in an angular extent of 180° about the central axis thereof, with a sheet-like recording medium F for recording an image thereon being attached to an inner circumferential surface of the drum 12. The internal-surface-scanning image recording apparatus 10 also has a pair of coaxial spinners 14, 16 disposed coaxially in the drum 12.

The spinners 14, 16 serve to reflect a laser beam L emitted from a laser beam generator 18 to scan the recording medium F with the reflected laser beam L in a main scanning direction indicated by the arrow X. The spinners 14, 16 comprise respective rotatable mirrors 24, 26 having respective reflecting surfaces 20, 22 inclined at 45° to the direction in which the laser beam L is applied thereto, and respective electric motors 28, 30 for rotating the respective rotatable mirrors 24, 26 about the central axis of the drum 12. The reflecting surfaces 20, 22 are oriented relatively to each other such that they reflect the laser beam L in respective directions which are opposite to each other, i.e., angularly spaced from each other by 180°.

The spinners 14, 16 are mounted on a movable base 32 threaded over a ball screw 36 extending parallel to the central axis of the drum 12 and having an end coupled coaxially to an electric motor 34. When the electric motor 34 is energized, therefore, the ball screw 36 is rotated about its own axis, axially displacing the spinners 14, 16 along the central axis of the drum 12, i.e., in an auxiliary canning direction Y which is perpendicular to the main scanning direction.

A laser beam modulator 40 is positioned to receive the laser beam L emitted by the laser beam generator 18. The laser beam L applied to the laser beam modulator 40 is modulated thereby depending on an image to be recorded on the recording medium F. The laser beam modulator 40 comprises an acousto-optic modulator (AOM), for example.

A laser beam switcher 42 is disposed downstream of the laser beam modulator 40 with respect to the direction of the laser beam L modulated by the laser beam modulator 40. The laser beam switcher 42 serves to orient the laser beam L toward the spinner 14 or the spinner 16 at a time. The laser beam switcher 42 comprises a disk 46 rotatable about its own axis by a disk motor 44 coupled coaxially to the disk 46. The disk 46 has a semicircular half area serving as a reflecting area 48 for reflecting the laser beam L, and another semicircular half area serving as a transmitting area 50 for transmitting the laser beam L therethrough.

Reflecting mirrors 52, 54 are disposed in a path of the laser beam L which extends from the laser beam switcher 42 to the spinner 14. The laser beam L from the laser beam switcher 42 is reflected by the reflecting mirrors 52, 54 toward the spinner 14. Similarly, reflecting mirrors 56, 58 are disposed in a path of the laser beam L which extends from the laser beam switcher 42 to the spinner 16. The laser beam L from the laser beam switcher 42 is reflected by the reflecting mirrors 56, 58 toward the spinner 14.

Figure 3:
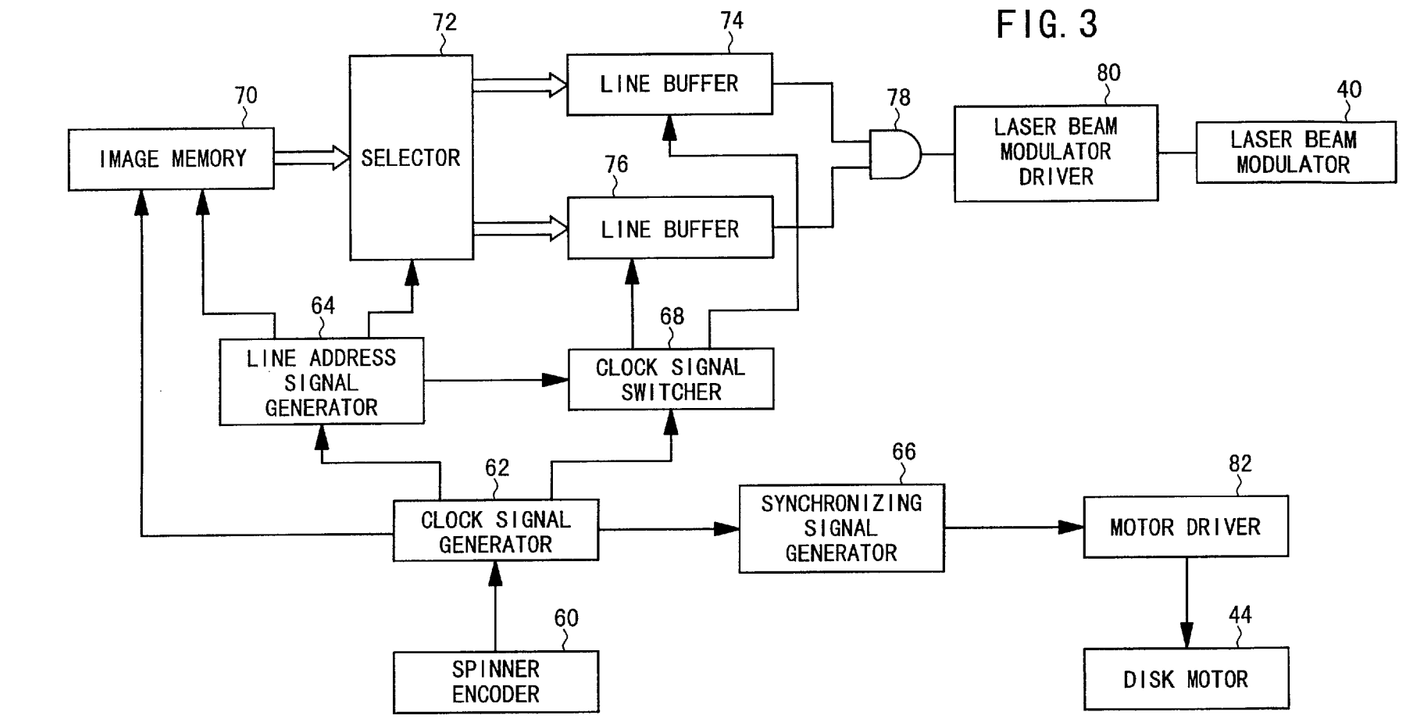
FIG. 3 is a block diagram of a control system for the internal-surface-scanning image recording apparatus shown in FIG. 1.

FIG. 3 shows in block form a control system for the internal-surface-scanning image recording apparatus shown in FIGS. 1 and 2.

As shown in FIG. 3, the control system includes a spinner encoder 60 which generates a pulse signal representative of the angular position of the rotatable mirrors 24, 26. The pulse signal generated by the spinner encoder 60 is supplied to a clock signal generator 62 which generates a clock signal corresponding to pixels to be recorded on the recording medium F. The generated clock signal is supplied to a line address signal generator 64, a synchronizing signal generator 66, a clock signal switcher 68, and an image memory 70.

The image memory 70 stores image data to be recorded on the recording medium F. The line address signal generator 64 generates a line address signal for reading one line of image data in the main scanning direction X at a time from the image memory 70, based on the clock signal supplied from the clock signal generator 62.

Line buffers 74, 76 are connected to the image memory 70 via a selector 72. The selector 72 alternately selects the line buffers 74, 76, each storing one line of image data read from the image memory 70, according to the output timing of a line address signal from the line address signal generator 64. The clock signal switcher 68 supplies the clock signal from the clock signal generator 62 selectively to the line buffers 74, 76 according to the output timing of the line address signal from the line address signal generator 64.

A laser beam modulator driver 80 is connected to the line buffers 74, 76 via an AND gate 78. The laser beam modulator driver 80 energizes the laser beam modulator 40 based on the image data supplied from one of the line buffers 74, 76 at a time.

Based on the clock signal from the clock signal generator 62, the synchronizing signal generator 66 generates and supplies a synchronizing signal to a motor driver 82 for energizing the disk motor 44 coupled to the disk 46 in synchronism with the angular position of the spinners 14, 16.

Figure 4:
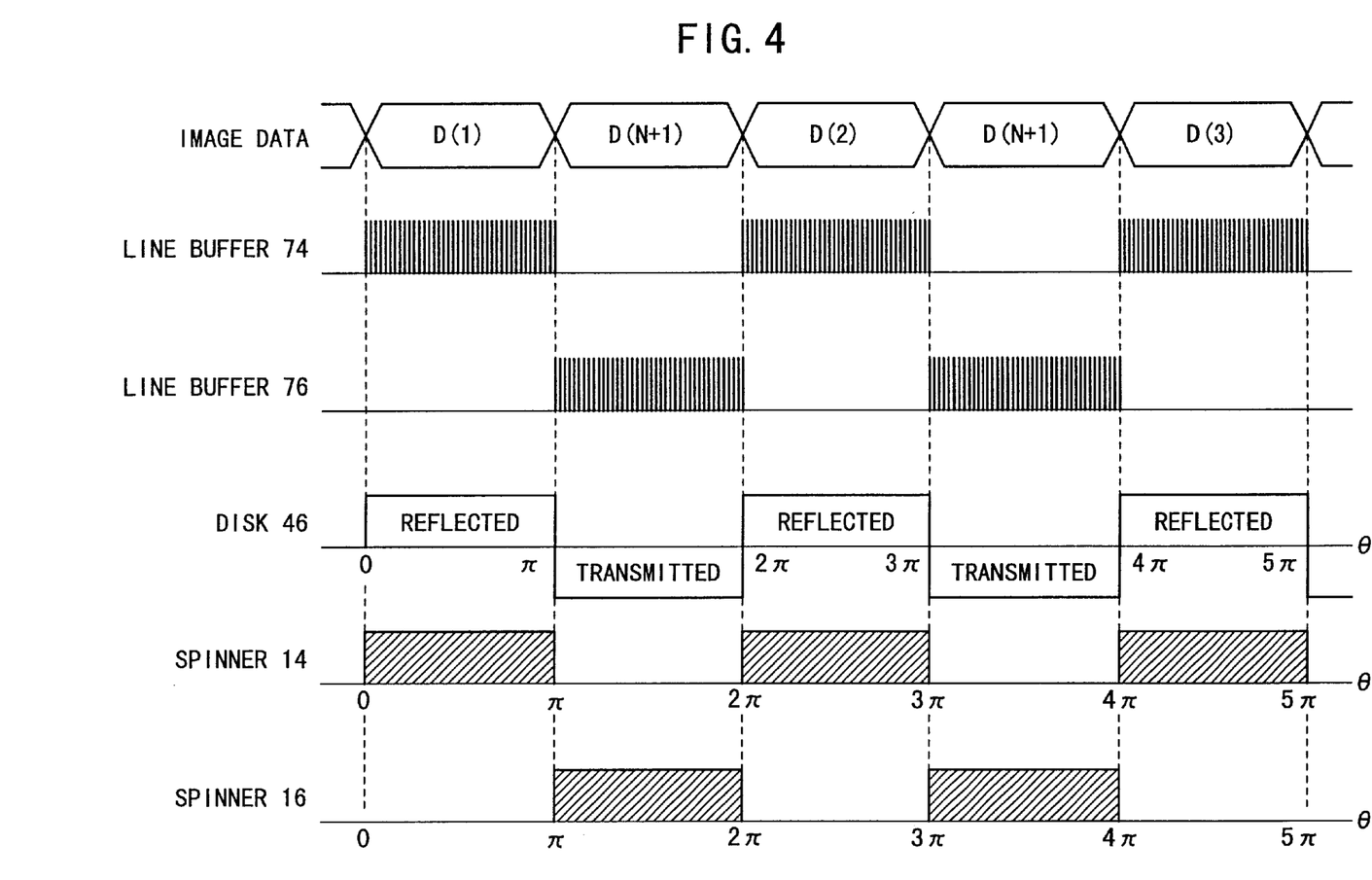
FIG. 4 is a timing chart of a control sequence of the control system shown in FIG. 3.

Operation of the internal-surface-scanning image recording apparatus 10 will be described below with reference to FIG. 4.

Figure 5:
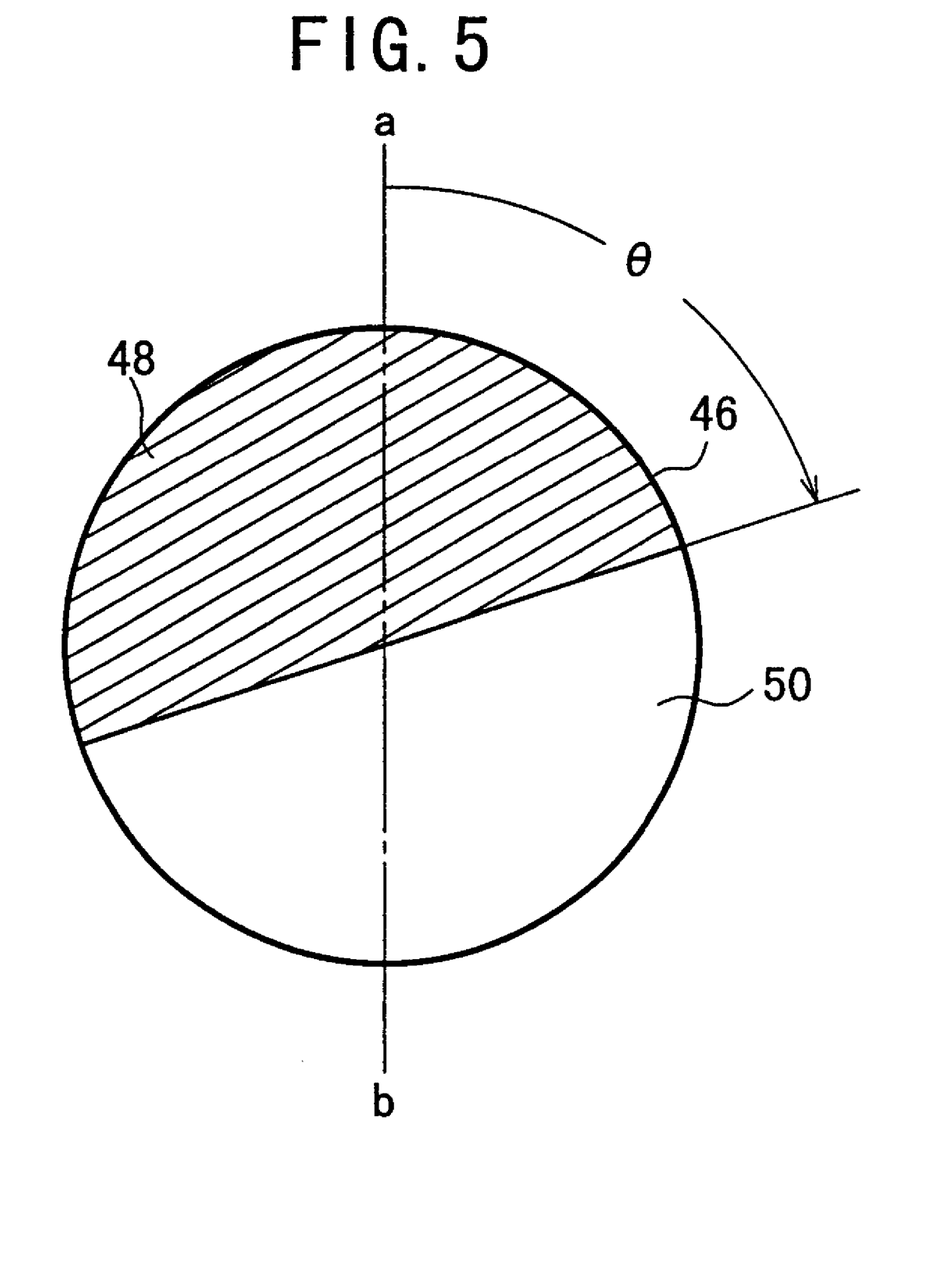
FIG. 5 is a front elevational view of a disk used in the internal-surface-scanning image recording apparatus shown in FIG. 1.

Prior to starting to record a desired image on the recording medium F, a boundary line a–b between the reflecting area 48 and the transmitting area 50 of the disk 46 is aligned with a position where the laser beam L emitted from the laser beam generator 18 is applied through the laser beam modulator 40 (see FIGS. 1 and 5). The reflecting surfaces 20, 22 of the rotatable mirrors 24, 26 of the spinners 14, 16 are oriented in respective directions to guide the laser beam L to respective opposite ends of the recording medium F attached the drum 12.

Figure 6:
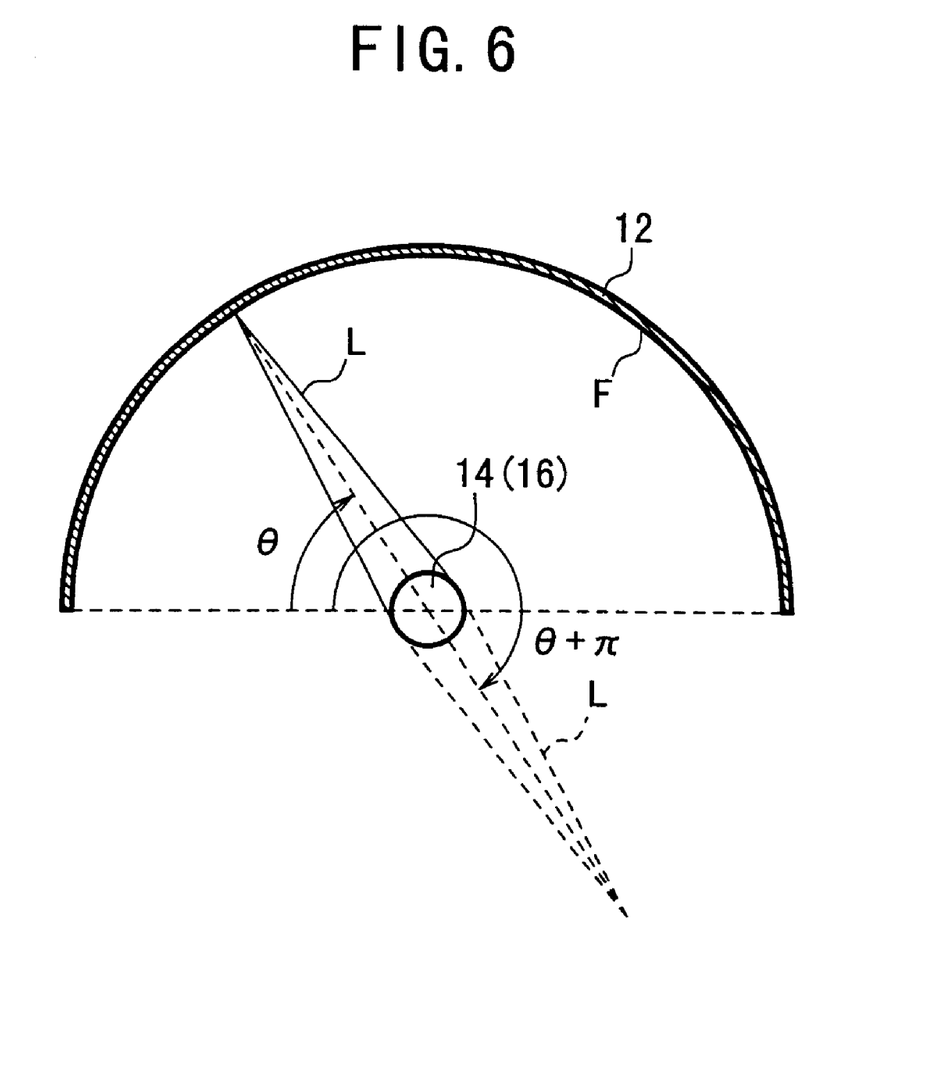
FIG. 6 is a cross-sectional view showing the manner in which the internal-surface-scanning image recording apparatus shown in FIG. 1 operates.

Then, the rotatable mirrors 24, 26 of the spinners 14, 16 are rotated clockwise in FIG. 6, and the disk 46 is also rotated clockwise in FIG. 5 in synchronism with the spinners 14, 16 for thereby starting to record the desired image on the recording medium F with the laser beam L which is modulated depending on the image by the laser beam modulator 40.

When the spinners 14, 16 start rotating, the spinner encoder 60 coupled thereto generates and supplies a pulse signal to the clock signal generator 62, which generates a clock signal. The generated clock signal is supplied to the line address signal generator 64, the synchronizing signal generator 66, the clock signal switcher 68, and the image memory 70. The synchronizing signal generator 66 generates a synchronizing signal from the supplied clock signal, and supplies the generated synchronizing signal to the motor driver 82. Based on the supplied synchronizing signal, the motor driver 82 energizes the disk motor 44 to rotate the disk 46 in synchronism with the spinners 14, 16. The angular displacement θ of the spinners 14, 16 is identical to the angular displacement θ of the disk 46 at all times.

The line address signal generator 64 which is supplied with the clock signal from the clock signal generator 62 generates line address signals depending on the number of clock pulses of the clock signal, and outputs the generated line address signals to the image memory 70. Specifically, if it is assumed that the number of pixels of one main scanning line of the image to be recorded on the recording medium F is represented by n, the line numbers of main scanning lines of the image to be recorded on the recording medium F by the spinner 14 are represented by 1, 2, . . . , N, and the line numbers of main scanning lines of the image to be recorded on the recording medium F by the spinner 16 are represented by N+1, N+2, . . . , 2N, for example, then the line address signal generator 64 generates line address signals corresponding to the line numbers 1, N+1, 2, N+2, 3, . . . , 2N for respective n clock pulses of the clock signal, and supplies the generated line address signals to the image memory 70.

One line of image data D(1) in the main scanning direction X which is based on an address represented by the line address signal corresponding to the line number 1 is now read from the image memory 70 according to the clock signal, and supplied to the selector 72.

The selector 72 stores the line of image data D(1) read from the image memory 70 into the line buffer 74. The line of image data D(1) stored in the line buffer 74 is supplied to the laser beam modulator driver 80 via the AND gate 78. The laser beam modulator driver 80 then energizes the laser beam modulator 40 according to the supplied image data D(1).

The laser beam L emitted from the laser beam generator 18 is turned on and off, i.e., modulated, by the laser beam modulator 40 which is energized according to the supplied image data D(1), and then applied to the disk 46 of the laser beam switcher 42. At this time, the laser beam L is fully reflected by the reflecting area 48 of the disk 46, and then reflected by the reflecting mirrors 52, 54 toward the reflecting surface 20 of the spinner 14. The laser beam L is then reflected by the reflecting surface 20, and applied to the recording medium F attached to the inner circumferential surface of the drum 12 while the disk 46 and the spinner 14 are rotating 180° (π radian), thereby recording one line of image corresponding to the line number 1 on the recording medium F.

While the image data D(1) stored in the line buffer 74 is being read and the line of image corresponding to the line number 1 is being recorded on the recording medium F, the line address signal generator 64 supplies a generated line address signal corresponding to the line number N+1 to the image memory 70. One line of image data D(N+1) based on an address represented by the line address signal corresponding to the line number N+1 is now read from the image memory 70, and supplied via the selector 72 to the line buffer 76.

When the disk 46 and the spinners 14, 16 rotate 180°, the clock signal switcher 68 supplies the clock signal from the clock signal generator 62 to the line buffer 76 according to the line address signal from the line address signal generator 64. The line of image data D(N+1) stored in the line buffer 76 is read and supplied to the laser beam modulator driver 80 via the AND gate 78.

The laser beam modulator driver 80 then energizes the laser beam modulator 40 according to the supplied image data D(N+1) for thereby modulating the laser beam L from the laser beam generator 18. The modulated laser beam L passes through the transmitting area 50 of the disk 46, and then reflected by the reflecting mirrors 56, 58 toward the reflecting surface 22 of the spinner 16. The laser beam L is then reflected by the reflecting surface 22, and applied to the recording medium F attached to the inner circumferential surface of the drum 12 while the disk 46 and the spinner 16 are rotating 180°, thereby recording one line of image corresponding to the line number N+1 on the recording medium F. During this time, the laser beam L is not applied to the spinner 14.

The above cycle of operation is repeated to cause the spinners 14, 16 to alternately record 1st, (N+1)th, 2nd, (N+2)th, 3rd, . . . lines of image on the recording medium F. Since the laser beam L is applied in its entirety to the spinner 14 or 16 which is recording a line of image, the desired image is recorded efficiently on the recording medium F without an undue waste of laser beam energy.

Figure 7:
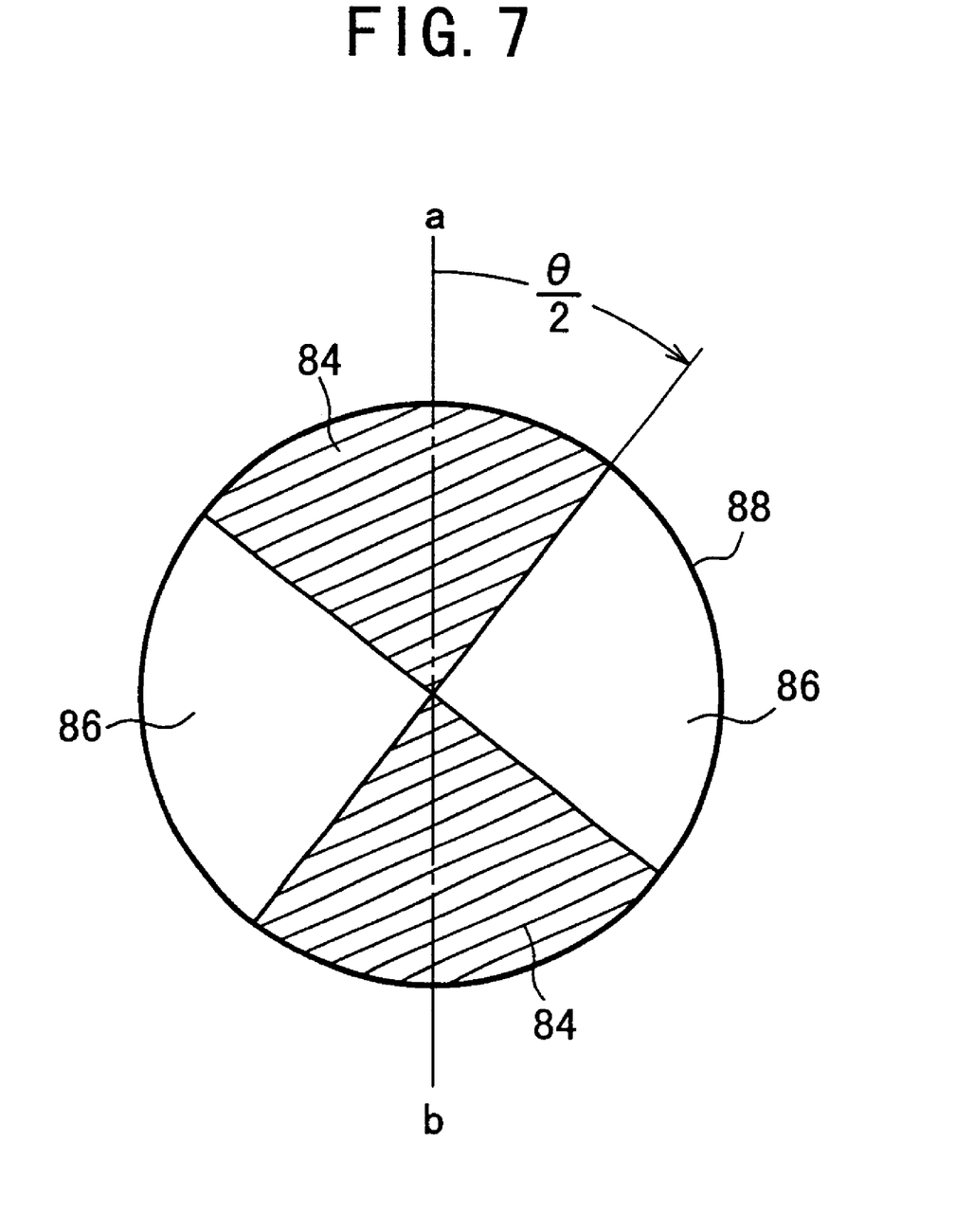
FIG. 7 is a front elevational view of a disk according to another embodiment of the present invention.

FIG. 7 shows a disk 88 according to another embodiment of the present invention. As shown in FIG. 7, the disk 88 has a pair of diametrically opposite reflecting area 84 and a pair of diametrically opposite transmitting areas 86 positioned circumferentially between the reflecting area 84. Each of the reflecting and transmitting areas 84, 86 has a sector shape with two radii angularly spaced 90° from each other. Therefore, as the disk 88 rotates, a laser beam applied to the disk 88 alternately sees the reflecting and transmitting areas 84, 86 at 90° intervals. A control system for an internal-surface-scanning image recording apparatus which incorporates the disk 88 shown in FIG. 7 is arranged such that while the disk 88 is rotating an angle of θ/2, the spinners 14, 16 rotate an angle of θ.

In the case where the disks 46, 88 having the reflecting areas 48, 84 and the transmitting areas 50, 86 are used to reflect and transmit the laser beam L, it is necessary to take into account wobbling of the disks 46, 88, thickness variations thereof, and parallelism of their opposite surfaces because these factors affect the direction of the laser beam L that is reflected and transmitted by the disks 46, 88. Therefore, in view of the above factors, the laser beam modulator 40 is controlled to modulate the laser beam L depending on desired image data, and the angle at which the laser beam L is applied to the disks 46, 88 is corrected depending on the angular displacement θ of the disks 46, 88, so that a highly accurate image will be recorded on the recording medium F.

Figure 8:
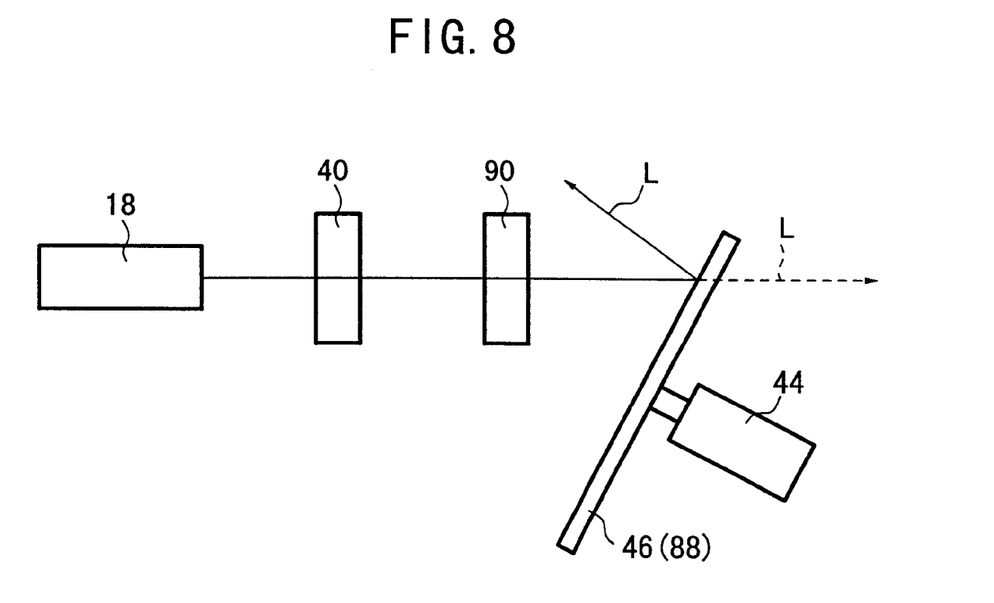
FIG. 8 is a schematic view of a portion of an internal-surface-scanning image recording apparatus according to still another embodiment of the present invention.

FIG. 8 shows a portion of an internal-surface-scanning image recording apparatus according to still another embodiment of the present invention. In FIG. 8, a direction correcting unit 90 comprising an acousto-optic deflector (AOD), an electro-optic deflector (EOD), or the like is disposed between the laser beam modulator 40 and the disk 46, 88. While the laser beam L is being modulated by the laser beam modulator 40 depending on image data, the direction of the laser beam L to be applied to the disk 46, 88 is corrected by the direction correcting unit 90.

In the above embodiments, the disks 46, 88 having the reflecting areas 48, 84 and the transmitting areas 50, 86 are rotated in synchronism with the spinners 14, 16 for thereby switching the laser beam L. However, the laser beam L may be switched without the need for such rotating disks other than the spinners 14, 16.

Figure 9:
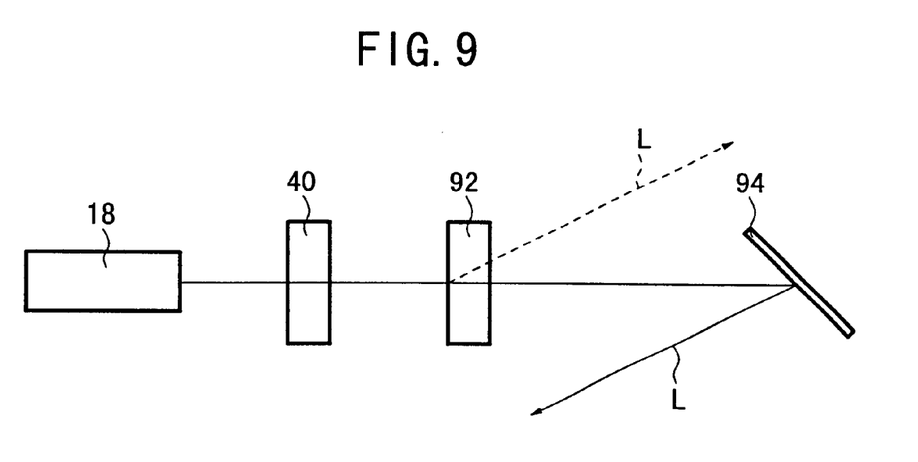
FIG. 9 is a schematic view of a portion of an internal-surface-scanning image recording apparatus according to yet another embodiment of the present invention.

Specifically, FIG. 9 shows a portion of an internal-surface-scanning image recording apparatus according to yet another embodiment of the present invention. In FIG. 9, an optical switch 92 comprising an acousto-optic deflector (AOD), an electro-optic deflector (EOD), or the like, and a fixed mirror 94 are positioned downstream of the laser beam modulator 40. The optical switch 92 serves to control the direction in which the laser beam L is refracted thereby. When a line of image is recorded by the spinner 14, the optical switch 92 is controlled to guide the laser beam L to the spinner 14 via the fixed mirror 94. When a line of image is recorded by the spinner 16, the optical switch 92 is controlled to guide the laser beam L to the spinner 16 in bypassing relation to the fixed mirror 94.

Figure 10:
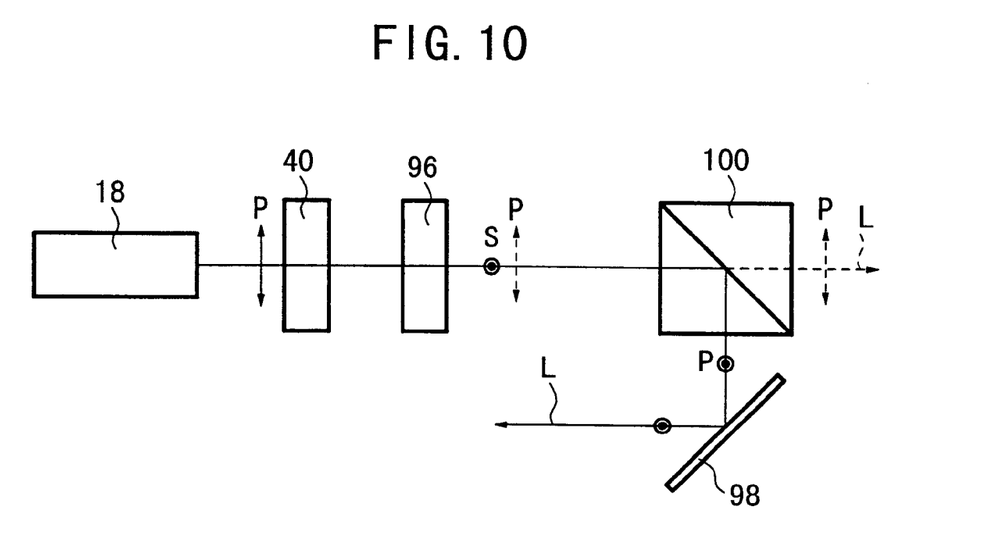
FIG. 10 is a schematic view of a portion of an internal-surface-scanning image recording apparatus according to yet still another embodiment of the present invention.

FIG. 10 shows a portion of an internal-surface-scanning image recording apparatus according to yet still another embodiment of the present invention. As shown in FIG. 10, an optical switch 96 comprising an electro-optic deflector (EOD), a Faraday-effect device, or the like for either converting a p-polarized laser beam L from the laser beam generator 18 into an s-polarized laser beam L or passing a p-polarized laser beam L from the laser beam generator 18 as it is, and a polarization beam splitter 100 for either passing a p-polarized laser beam L or reflecting an s-polarized laser beam L toward a fixed mirror 98, are positioned downstream of the laser beam modulator 40. When a line of image is recorded by the spinner 14, the optical switch 92 is controlled to convert the p-polarized laser beam L into an s-polarized laser beam L, which is applied to the polarization beam splitter 100. The polarization beam splitter 100 reflects the s-polarized laser beam L toward the fixed mirror 98, which in turn reflects the s-polarized laser beam L toward the spinner. When a line of image is recorded by the spinner 16, the optical switch 96 passes the p-polarized laser beam L as it is to the polarization beam splitter 100, which applies the p-polarized laser beam L to the spinner 16.

The internal-surface-scanning image recording apparatus shown in FIG. 10 is also simplified in structure because it does not require rotating members such as the laser beam switcher 42.

Although certain preferred embodiments of the present invention have been shown and described in detail, it should be understood that various changes and modifications may be made therein without departing from the scope of the appended claims.

What is claimed is:

1. An internal-surface-scanning image recording apparatus for applying a modulated light beam to a recording medium to record an image thereon, comprising:

a semicylindrical member for supporting the recording medium on an inner circumferential surface thereof;

a light source for emitting the light beam;

a first rotatable mirror disposed on a central axis of said semicylindrical member and having a first rotatable reflecting surface for reflecting the light beam in a first direction toward said recording medium supported by said semicylindrical member;

a second rotatable mirror disposed on the central axis of said semicylindrical member and having a second rotatable reflecting surface for reflecting the light beam in a second direction different from said first direction toward said recording medium supported by said semicylindrical member; and switching means for guiding the light beam selectively to either said first rotatable mirror or said second rotatable mirror which is angularly positioned to apply the light beam to said recording medium.

2. An internal-surface-scanning image recording apparatus according to claim 1, wherein said light source comprises a laser beam generator for emitting a laser beam.

3. An internal-surface-scanning image recording apparatus according to claim 1, wherein said first rotatable reflecting surface and said second rotatable reflecting surface are rotated and said first rotatable mirror and said second rotatable mirror are displaced along the central axis of said semicylindrical member to apply the light beam two-dimensionally to said recording medium.

4. An internal-surface-scanning image recording apparatus according to claim 1, wherein said first rotatable reflecting surface and said second rotatable reflecting surface are inclined at about 45° to an incident direction in which the light beam is applied thereto, and are rotatable about said incident direction.

5. An internal-surface-scanning image recording apparatus according to claim 1, wherein said first rotatable reflecting surface and said second rotatable reflecting surface are oriented relatively to each other for reflecting said light beam respectively in said first and second directions which are angularly spaced from each other by 180°.

6. An internal-surface-scanning image recording apparatus according to claim 1, wherein said switching means comprises a disk having a reflecting area for reflecting the light beam toward said first rotatable mirror and a transmitting area for passing the light beam toward said second rotatable mirror, said disk being rotatable about its own axis in synchronism with said first rotatable mirror and said second rotatable mirror.

7. An internal-surface-scanning image recording apparatus according to claim 6, wherein when said disk is rotated, said reflecting area and said transmitting area thereof move alternately across a position where the light beam is applied to said disk each time said disk is angularly moved about 180° about its own axis.

8. An internal-surface-scanning image recording apparatus according to claim 6, wherein when said disk is rotated, said reflecting area and said transmitting area thereof move alternately across a position where the light beam is applied to said disk each time said disk is angularly moved about 90° about its own axis.

9. An internal-surface-scanning image recording apparatus according to claim 6, further comprising a direction correcting unit disposed between said light source and said disk for correcting an incident direction in which the light beam is applied to said disk.

10. An internal-surface-scanning image recording apparatus according to claim 1, wherein said switching means comprises an optical switch for controlling a direction in which the light beam is refracted thereby, for guiding the light beam selectively to said first rotatable mirror or said second rotatable mirror.

11. An internal-surface-scanning image recording apparatus according to claim 10, wherein said optical switch comprises an acousto-optic deflector.

12. An internal-surface-scanning image recording apparatus according to claim 10, wherein said optical switch comprises an electro-optic deflector.

13. An internal-surface-scanning image recording apparatus according to claim 1, wherein said switching means comprises an optical switch for controlling a direction of polarization of the light beam, and a polarization beam splitter for reflecting or transmitting the light beam depending on the direction of polarization thereof for guiding the light beam selectively to said first rotatable mirror or said second rotatable mirror.

* * * * *